H. N. THOMAS.
HORSE DETACHER.
APPLICATION FILED MAY 8, 1912.
1,070,855.
Patented Aug. 19, 1913.
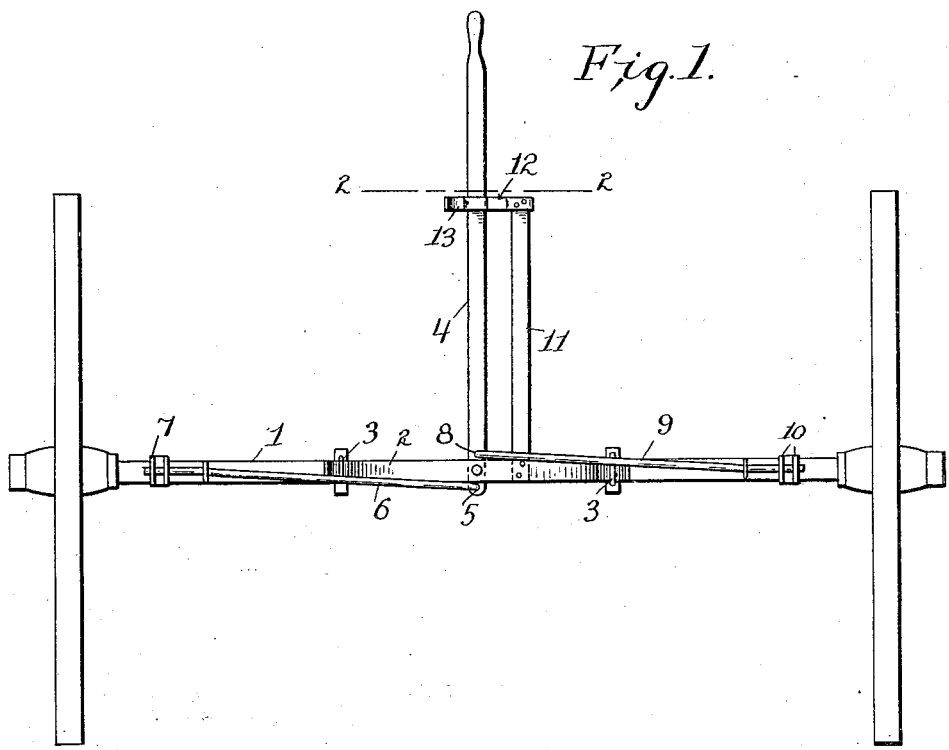
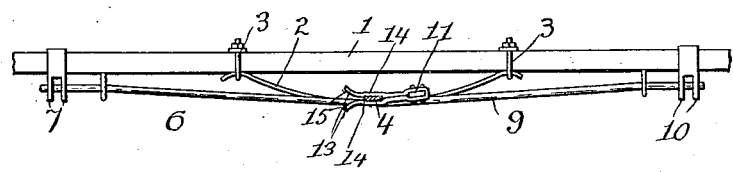
Witnesses
R. H. Jones.
Inventor
H. N. Thomas.
By
Attorneys

UNITED STATES PATENT OFFICE.

HUMPHREY N. THOMAS, OF ARKANA, ARKANSAS.

HORSE-DETACHER.

1,070,855.  Specification of Letters Patent.  Patented Aug. 19, 1913.

Application filed May 8, 1912. Serial No. 695,966.

*To all whom it may concern:*

Be it known that I, HUMPHREY N. THOMAS, a citizen of the United States, residing at Arkana, in the county of Baxter, State of Arkansas, have invented certain new and useful Improvements in Horse-Detachers; and I do hereby declare the following to be a full, clear, and exact description of the invention, such as will enable others skilled in the art to which it appertains to make and use the same.

This invention is directed to improvements in horse detachers, and has for its object to construct a device provided with means for releasing a runaway horse from a vehicle.

With these and other objects in view, the invention consists in certain novel features of construction, combination and arrangement of parts as will be hereinafter fully described and claimed.

In the drawing: Figure 1 is a front view showing the device attached to the axle of a vehicle. Fig. 2 is a sectional view on line 2—2 of Fig. 1.

Referring to the drawing, the numeral 1 designates the front axle of a vehicle, the same having secured to its front face an outwardly curved plate 2. The opposite ends of the plate 2 are engaged by clips 3 which embrace the axle 1, and thus securely hold the plate in place.

Pivotally connected near its lower end to the inner central surface of the plate 2 is a lever 4, the lower end of which projects a short distance below the lower edge of the plate 2, and is formed with a perforation 5 in which is pivotally connected the inner end of a rod 6, the outer end of which being slidably supported by a pair of spaced eyes 7 which are connected to the axle 1 in any suitable manner. The lever 4 is further provided with a perforation 8, the same being located at a point slightly above the upper edge of the plate 2, and is adapted to pivotally receive the inner end of a rod 9, the outer end of which being likewise slidably engaged in a pair of spaced eyes 10 also carried by the axle 1.

Rigidly connected at its lower end to the inner surface of the plate 2 is a vertical bar 11, and to the upper end of which is secured a metallic plate 12, the same being bent upon itself to produce a pair of resilient fingers 13, each of which are formed with depressions 14, which when confronting form a recess for receiving the lever 4, at a point near its upper end. The free end of the fingers 13 diverge slightly away from each other to provide a mouth 15 for guiding the lever to the recess formed by the depression 14, and after the lever has been shifted to withdraw the ends of the rods 6 and 9 from the spaced eyes 7 and 10, thus releasing the shaft, the eyes of which having been previously engaged between the eyes 7 and 10 by the outer ends of the rods 6 and 9.

It is obvious from this construction that when the driver has lost control of the horse, it is only necessary that the lever 4 be grasped and forced from engagement by the fingers 13, thus actuating the rods 6 and 9 to release the shaft with the horse.

What is claimed is:

A horse detacher comprising an outwardly curved plate adapted to be secured to the front axle of a vehicle, a lever pivotally connected near its lower end to the center of the plate, rods having their inner ends pivotally connected to the lever, the outer ends of said rods being supported for engaging a shaft by eyes carried by the axle, a vertical bar having its lower end rigidly connected to the plate adjacent the pivoted end of the lever, a pair of resilient fingers secured to the upper end of the bar, said fingers being provided with depressions which when confronting form a recess for yieldably engaging the lever near its upper end to hold the same from becoming accidentally shifted.

In testimony whereof, I affix my signature, in presence of two witnesses.

HUMPHREY N. THOMAS.

Witnesses:
 E. T. CONLEY,
 J. H. WOLF.

Copies of this patent may be obtained for five cents each, by addressing the "Commissioner of Patents, Washington, D. C."